March 6, 1962 K. MAICHEN 3,023,642
INFINITELY VARIABLE EPICYCLIC FRICTION WHEEL GEAR
Filed Jan. 10, 1961 2 Sheets-Sheet 1
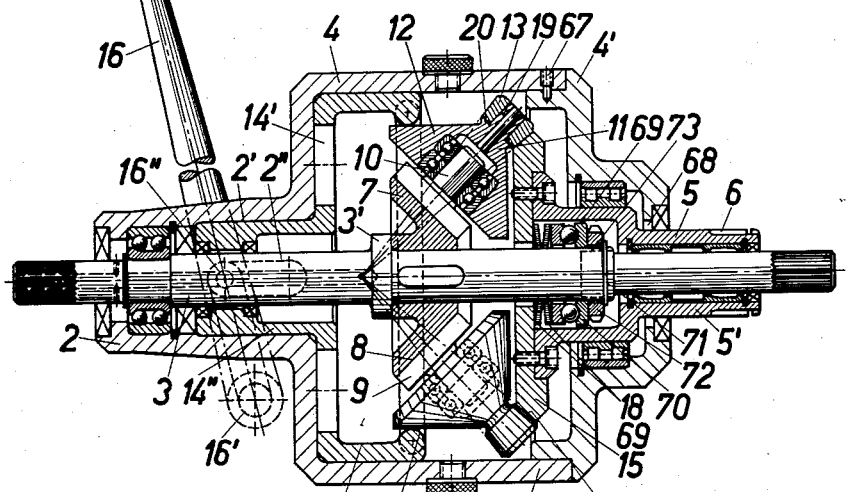
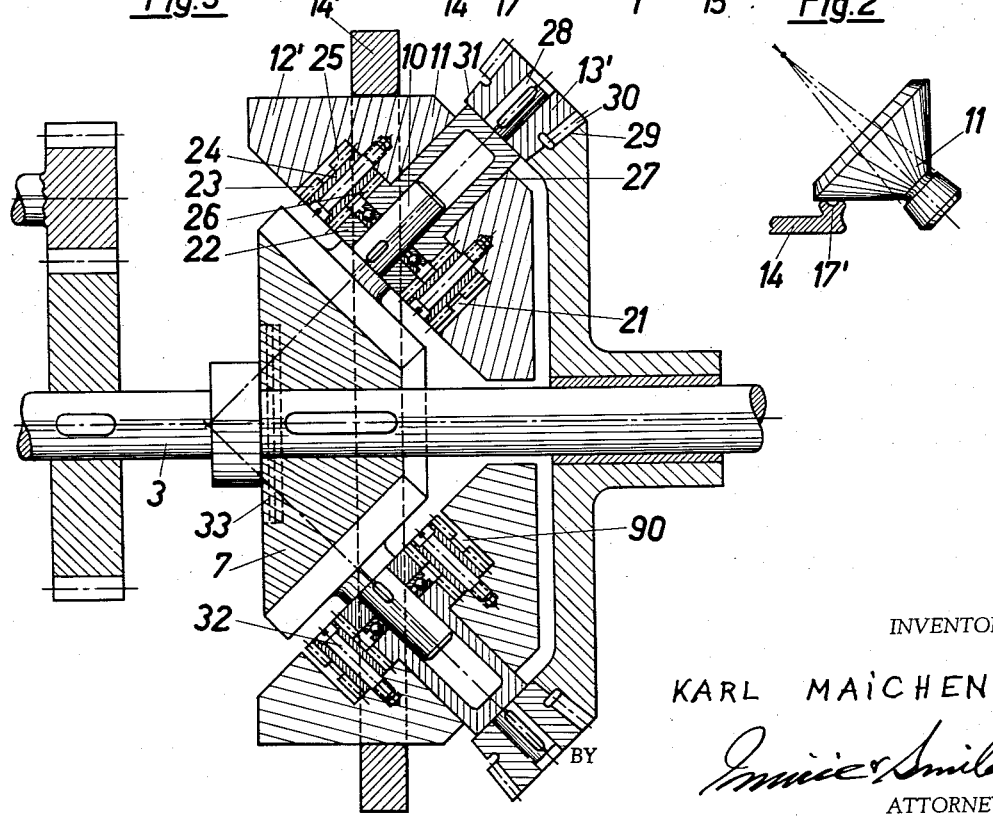
INVENTOR
KARL MAICHEN
BY
ATTORNEYS

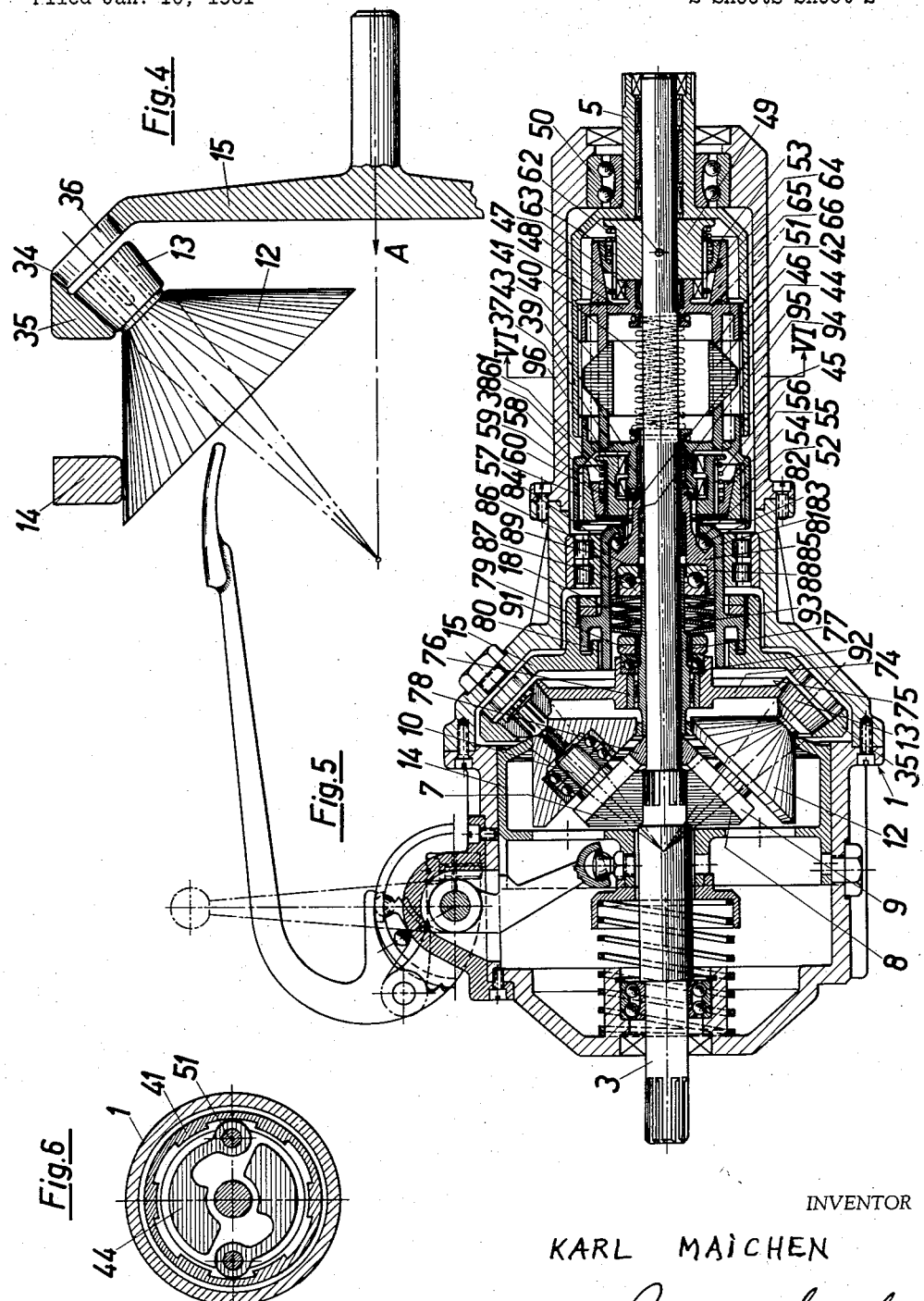

United States Patent Office 3,023,642
Patented Mar. 6, 1962

3,023,642
INFINITELY VARIABLE EPICYCLIC FRICTION WHEEL GEAR
Karl Maichen, Lauterach 269, Austria
Filed Jan. 10, 1961, Ser. No. 81,863
Claims priority, application Austria Jan. 11, 1960
9 Claims. (Cl. 74—796)

The invention relates to an infinitely variable epicyclic friction wheel gear, which is suitable for high transmission ratios and a transmission of high powers. Being small in dimensions, it is particularly suitable also for incorporation in motor vehicles.

It is a feature of the invention that the infinitely variable epicyclic friction wheel gear comprises a housing having rotary input and output members mounted therein, at least one pin connected to one of said rotatable members, said pin extending outwardly with respect to the axis of said member, a planet wheel consisting of a double cone formed by two detachably interconnected cones, said double cone being slidably fitted on the pin, said rotatable members tending to thrust the planet wheel outwardly on its pin by centrifugal force, an axially displaceable rolling element centrally disposed with respect to the gear axis and cooperating with one of the two cones of the planet wheel, and means for transmitting the rotary movement from the other cone to the output member.

Another feature of the invention resides in that the planet wheels are guided in dovetail grooves.

According to a further feature of the invention those cones of the planet wheels which cooperate with the output member engage a backing wheel, which rests on the gear shaft.

Finally it is a feature of the invention that the backing wheel is under the influence of coupling members which exert a reaction pressure and which lie in the path along which force is transmitted between the planet wheels and the output member.

The invention will be explained more fully with reference to the drawing, in which several illustrative embodiments of the infinitely variable epicyclic friction wheel gear according to the invention are shown. FIG. 1 is an axial longitudinal sectional view showing the gear. FIG. 2 shows a detail of the gear. FIG. 3 is an axial longitudinal sectional view showing a second embodiment of the gear. FIG. 4 shows a further variant thereof. FIG. 5 is an axial longitudinal sectional view showing an additional embodiment of the gear, and FIG. 6 is a sectional view taken on line VI—VI of FIG. 5.

The gear shown in FIG. 1 has a cylindrical housing 1, which consists of two parts 4, 4' interconnected by screws 67. At its outwardly directed end, the part 4 merges into a hub 2, in which the input shaft 3 is mounted. The other part 4' forms a cover and has a bore 68, in which the output member 5 is rotatably mounted, which consists of a reduced hollow shaft and has at its outwardly disposed end a gear ring 6, from which the drive for the element to be driven can be derived.

The input shaft 3 extends through the housing 1, inclusive of the output member 5, and is mounted in the reduced part 5' thereof. It can be selectively connected to the driving element at one or the other of the ends protruding from the hub 2 and the part 5', respectively, or at both ends.

A star-shaped member 7 bearing on the collar 3' is keyed to the input shaft 3 inside the housing 1 and on its periphery is formed with angularly spaced dovetail grooves 8, which are inclined with respect to the gear axis and serve as guides. Slide members 9 of dovetail cross-section are slidably mounted in said grooves and carry pins 10, on which the planet wheels 11 are slidably mounted. These pins 10 extend at right angles to the direction of movement of the blocks 9 and at a preferably acute angle to the gear axis. Each of the planet wheels 11 consists of two detachably interconnected cones, the inner one 12 of which coacts with a race 14, whereas the outer cone 13 imparts rotation to the disc 15, which is connected by screws 69 to the output member 5. For this purpose, the disc 15 has a conical face 15' firmly engaging the cone 13.

The number of planet wheels 11 may be as large as desired. It is recommendable to arrange them with a regular angular spacing to obtain a system having rotary balance.

The race 14 has the function of a fixed sun wheel and is axially displaceable in the housing 1 and held against rotation. The ring 14 has a bottom part 14' and a hub part 14'', which is guided in the cylindrical inside bore 2' of the hub 2. In the drawing, the race 14 is in its extreme outer end position near the hub 2. To enable an axial displacement of the race 14, a lever 16 is provided, which is pivoted at 16' to a stationary part not shown and which acts on the hub part 14'' by means of a slide member 16'' extending through a slot 2'' of the hub 2. To allow for the change of the distance between the slide member 16'' and the pivot 16' during the displacement of the ring, the slide member 16'' is adjustably mounted in the axial direction of the lever. The desired step-up or step-down transmission ratio of the gear is adjusted by displacing the race 14 by means of the lever 16. In the illustrative embodiment shown, the race 14 contacts the cone 12 on a surface 17 having a semi-circular cross-sectional shape. The cone 12 is urged against the race 17 by the centrifugal force of the planet wheels 11, which is assisted by the force of plate springs 18 acting on the disc 15. These plate springs increase also the force whereby the cones 13 are urged on the disc 15 and at their ends remote from the disc 15 bear on an abutment 70, which is supported by a nut, which is threaded on the threaded portion 73 of the shaft 3 and locked by a circlip 71 or the like element. The reaction pressure from the output member 5 is also used for urging the cones 12, 13 on the associated faces of the race. For this purpose, the output member may be provided with special means. For instance, the gear ring 6 may be formed with helical teeth or a pinion having a coarse thread may be fitted on and connected to the output tube. Finally, the reaction pressure may be produced by a special element which is indicated at 82—84 in FIG. 5 and will be explained more fully in the corresponding part of the specification.

The cone 12 is provided with an extension 19 at its small end and a cone 13 consisting of an independent member is fitted on said extension. The cones 13 and 12 are coupled for joint rotation by teeth 20. Other means for coupling the two cones 12, 13 may be chosen, of course. The range within which the gear is adjustable can be varied by a change in the cross-sectional dimension of the cone and of the disc 15, which consists preferably of plastic. This change in cross-sectional dimensions is effected by a replacement of the cones 13 and of the disc 15.

In a desirable embodiment of the transmission, the dovetail groove 8 extends at an angle of 45° to the longitudinal axis of the drive shaft and the generatrices of the cone 13 and of the rolling surface of the disc 15 extend through the intersection of the center lines of the planet wheels 11 and of the longitudinal axis of the drive shaft 3.

The race 14, more particularly that portion thereof which engages the planet wheels 11, may consist of plastic and it is suitable to provide a rolling surface having a heart-shaped cross-section, as is shown in FIG. 2. In this case the rolling surface 17' of the race 14 is flattened as the cone 13 is urged against the same so that an intimate contact between these two members is ensured. Finally, the rolling surface of the race 14 may be flat or have a different shape.

If the gear is used in automotive engineering, the disc 15 may be connected to the output member 5 by a coupling, preferably a flexible coupling, to ensure a gentle start.

The gear can operate in all positions. Alternatively, the part 5 may be used as an input member and the shaft 3 may be used as an output member.

Various changes in design are possible within the scope of the invention. For instance, the race 14 may be designed as a plunger and the surrounding portion of the housing 1 may consist of an oil pressure cylinder. In this case, the adjustment of the race is effected by supplying oil to or discharging it from the cylinder.

As is shown in FIG. 3, the planet wheels 11 may be connected by a separate epicyclic gear 21 to the pin 10 on which they are mounted. In this case, a fixed sun wheel formed with a gear ring is keyed on the pin 10 and meshes with the gear ring 23 of a planet wheel 24 having two gear rings 23, 25. The second gear ring of this planet wheel meshes with the gear ring 26 of a sleeve 27 loosely fitted on the free end of the pin 10. This sleeve serves for connecting the inner cone 12' to the outer cone 13', which is keyed on a pin 28 extending from the free end of the sleeve 27. The cone 13' has teeth 30 meshing with a gear ring 29 of the disc 15 connected to the output member and a run-up surface 31.

The planet wheel 21 is accommodated in a recess 90 of the inner cone 12' and is mounted on a pin 32 threaded into this cone. The epicyclic gear 21 may comprise friction wheels rather than gear wheels.

In both embodiments of the gear, the torque conversion may also be effected by an axial displacement of the star-shaped member 7. In this case the race 14 is fixed and the star-shaped member 7 is provided with a coupling 33 indicated in broken lines in FIG. 3.

The gear shown in FIG. 3 is similar in operation to that shown in FIG. 1. The difference resides in that the rotation imparted to the cone 12' is not transmitted directly but by means of the planet wheel 24 rolling on the sun wheel 22 and by the sleeve 27 to the cone 13', which imparts motion to the disc 15 of the output member.

The inclined suspension of the planet wheels 11, i.e., the mounting of the pins 10 carrying the planet wheels in the inclined grooves 8, ensures a desirable distribution of the forces acting on the planet wheels so as to increase the pressure between the cone 12 or 12' and the race 14 and between the cone 13 and 13' and the disc 15.

As is shown in FIGS. 4 and 5, the disc 15 connected to the output member may be provided with an extension 34, which extends over the cone 13 facing the disc. This extension engages the cone 13 on the outside facing the gear housing. The extension 34 is provided with bores 36 for the introduction of the cone 13 during the assembly of the gear. The disc 15 is movable in the direction of the arrow A to enable the cones 12 and 13 to be urged against the parts 14 and 35.

In the gear shown in FIG. 5, the inside of the cone 13 engages a backing wheel 74, the surface 75 of which coacts with the rolling surface of the cones 13.

The backing wheel 74 is mounted by means of a needle bearing 76 on a sleeve 77, which is longitudinally slidably mounted on the input shaft 3 and by means of an intermediate member 78 bears on the slide members 9.

The disc 15 has a hub 79 formed with an internal gear ring 80, which meshes with a corresponding external gear ring of a sleeve 81, which is formed with an internal roof-shape annular groove 82. This groove accommodates a plurality of balls 83, which engage a roof-shaped groove 84 of a second sleeve 85 mounted in the sleeve 81. The sleeve 85 has a shoulder 86, which supports the ball bearing 87, the race 88 of which is supported in the sleeve 85 whereas its race 89 bears on the sleeve 77. In the direction in which power is transmitted from the sleeve 85 to the backing wheel 74, the ball bearing 87 is followed by the plate springs 18, nuts 91 threaded on a screw thread of the sleeve 77 and a ball bearing 92. The disc springs 18 bear on a nose 93 of the sleeve 77.

That end of the sleeve 85 which faces the output member 5 is provided with an external gear ring 94, which meshes with the internal gear ring 95 of a coupling member 96, which has a second internal gear ring 37 for selectively engaging a gear ring 38 of a thrust member 39. This is longitudinally slidably mounted on the input shaft 3 and by a coil spring 40 is connected to a second thrust member, and is partly designed to have mirror symmetry. The two thrust members 39, 41 bear by means of oblique faces 42 on conical faces 43 of two jaws 44, which are mounted by means of pins 51 in the thrust members 39, 41 and are urged more or less outwardly in dependence on the speed.

The thrust members 39, 41 are provided with external gear rings 45, 46, which mesh with corresponding internal gear rings of the output member 5. The thrust member 41 has on its hub 47 an external gear ring 48, which can be caused to engage a corresponding gear ring of a coupling member 49, which is coupled by a pin 50 or the like to the input shaft 3.

The mode of operation of the gear shown is as follows: In the embodiment shown, the gear ring of the coupling member 49 is in mesh with the gear ring 48 of the thrust member 41. The gear ring 38 of the thrust member 39 is disengaged from the gear ring 37 of the coupling member 96. When the gear is in this position, the drive from the motor is directly transmitted to the output member 5. This setting corresponds to the direct drive of the motor vehicle. A decrease in the velocity of the vehicle will cause a reduction in the speed of the jaws 44. They move relative to the input shaft 3 and cause portions of the surfaces 42 having smaller radii to face the thrust members 39 and 41. Under the influence of the coil spring 40 the thrust members move relative to each other so that the gear ring 8 is disengaged from the corresponding gear ring of the coupling member 49 and the gear ring 38 is engaged with the gear ring 37 of the coupling member 96. Thus, the direct drive is disengaged and the drive is transmitted by means of the planet wheels. The rotation transmitted to the planet wheels from the input shaft 3 by the star-shaped member 7 is transmitted from the planet wheels by the disc 15, the teeth 80, the sleeve 81, the coupling balls 83, the sleeve 85, the gear rings 94, 95, the coupling member 96, the gear rings 37, 38, the thrust member 39 and the gear ring 45 to the driving member 5.

To synchronize the two rotary speeds transmitted to the driving member 5 in the position intermediate the direct drive and the torque conversion by the planet wheels, when the gear ring 48 engages the gear ring of the coupling member 49 and the gear rings 37, 38 are also engaged, each of the two power transmitting paths comprises an equalizing coupling 52 and 53, respectively, which in the present case is a friction coupling but could also be a multiple disc coupling. The coupling 52 consists of two wedges 54, 55, which are urged against each other by a coil spring 56. The wedge 54 has an external gear ring 57 in mesh with the internal gear ring 58 of the sleevelike extension 59 of the thrust member 39. The wedge 55 has an internal gear ring 60, which engages the external gear ring 61 of the coupling member 96. The coupling 53 consists of a cone, which is loaded by a coil spring 62 and which has an internal gear ring 63 in mesh with an external gear ring 64 of the coupling member 49. The conical surface of the cone 53 engages a conical inside surface 65 of a sleevelike extension 66 of the thrust member 41.

During the transmission of power, the planet wheels exert pressure by the balls 83 on the sleeve 85. This pressure is transmitted by the ball bearing 87 and the plate springs 18 to the sleeve 77 and from the latter is transmitted, on the one hand, by the intermediate member 78 to the slide members 9 to increase the force urging the cone 12 on the race 14, and, on the other hand, by the nuts 91 and the ball bearing 92 to the backing wheel 74 to increase the force whereby the cones 13 are urged on the race 35.

The backing wheel 74 serves not only to support the cones 13 but in addition transmits to the latter the forces from the springs 18 and due to the reaction pressure so as to increase the pressure applied. The backing wheel also permits of the overhung arrangement of the planet wheels.

It is obvious that the transmission is not only suitable for automotive engineering but for other purposes too. For instance, it may be used to advantage for tool-making purposes. In this case, the jaws 44 and the speed-dependent control elements associated therewith as well as the equalizing clutches 52, 53 can be eliminated. Power is transmitted from the sleeve 85 directly to the output shaft, which consists of an extension of the input shaft and may be mounted by means of a pin and a bearing in a central bore of the input shaft 3. The axially movable race 14 may be adjusted by a manually operated spindle, gear wheels and a rack.

Other modifications in design are also possible, of course. For instance, the star-shaped member 7 may be provided twice, with mirror symmetry.

What is claimed is:

1. An infinitely variable epicyclic friction wheel gear comprising a housing having a rotary input and output members mounted therein along a gear axis, at least one pin connected to one of said rotary members by a slide movable in a groove formed in said one rotary member, said pin extending outwardly with respect to the axis of said member and vertically to said groove, a planet wheel including a double cone formed by two detachably interconnected cones and slidably fitted on the pin, said one rotary member tending to thrust the planet wheel outwardly on its pin by centrifugal force, an axially displaceable race centrally disposed with respect to the gear axis and cooperating with one of the two cones of the planet wheel, and means for transmitting the rotary movement from the other cone to the output member.

2. A gear as set forth in claim 1, in which the race engages the planet wheels with a surface which is heart-shaped in cross-section.

3. A gear as set forth in claim 1, in which the disc connected to the output member is provided with an extension which extends over the cone facing said disc, which extension engages the outside of the cone by means of a ring and has bores through which the output cone can be passed.

4. A gear as set forth in claim 1, characterized in that those cones of the planet wheels which coact with the output member engage a backing wheel carried by a shaft in the gear axis.

5. A gear as set forth in claim 4, in which the backing wheel is under the influence of coupling members which exert a reaction pressure and are disposed in the path along which power is transmitted between the planet wheels and the output member.

6. A gear as set forth in claim 5, in which the coupling members exerting the reaction pressure include balls disposed in roof-shaped grooves of two sleeves fitted one in the other.

7. A gear as set forth in claim 6, in which the reaction pressure from the coupling members is transmitted by a sleeve surrounding the input shaft and by slide members to the cone coacting with the race.

8. A gear as set forth in claim 4, in which the members for transmitting power from the planet wheels to the output member comprise a governor, which interrupts the transmission of power and connects the input member directly to the output member at a predetermined speed.

9. A gear as set forth in claim 8, in which the governor is formed by unilaterally mounted, conical jaws, which are mounted between spring-loaded thrust pieces coupled to the output member, one or the other of said thrust pieces completing the path on which power is transmitted from the input member to the output member depending on the position of the jaws.

References Cited in the file of this patent

UNITED STATES PATENTS 2,836,994    Weber _____ June 3, 1958
2,886,986    Kopp _____ May 19, 1959